United States Patent [19]

Pirson et al.

[11] 4,436,647

[45] Mar. 13, 1984

[54] SELF-EMULSIFIABLE ANTIFOAMS

[75] Inventors: Ewald Pirson, Burghausen; Jakob Schmidlkofer, Mehring-Öd; Ernst Innertsberger, Burghhausen, all of Fed. Rep. of Germany

[73] Assignee: Wacker-Chemie GmbH, Munich, Fed. Rep. of Germany

[21] Appl. No.: 370,445

[22] Filed: Apr. 21, 1982

Related U.S. Application Data

[63] Continuation of Ser. No. 114,874, Jan. 24, 1980, abandoned.

[30] Foreign Application Priority Data

Jan. 30, 1979 [DE] Fed. Rep. of Germany ....... 2903423

[51] Int. Cl.$^3$ .............................................. B01D 17/00
[52] U.S. Cl. .................................. 252/358; 252/321; 524/45; 524/492; 524/493; 524/588
[58] Field of Search ................ 252/358, 321; 114/874; 524/45, 157, 492, 493, 588; 523/205, 209, 212, 216

[56] References Cited

U.S. PATENT DOCUMENTS 3,423,340 1/1969 Marshall et al. .................... 252/358
3,650,979 3/1972 Steinbach et al. .................. 252/358

Primary Examiner—Josephine Barr

[57] ABSTRACT

Self-emulsifiable antifoams containing an organopolysiloxane in which at least 80 mole percent of the siloxane units are dihydrocarbon siloxane units, a filler, a water-soluble cellulose derivative, and as an additional dispersant, at least one compound having the following general formula:

$$RCOO(CH_2)_2SO_3M$$

where R is an aliphatic hydrocarbon radical having at least 7 carbon atoms in which at least 10 percent of the number of R radicals must have at least 11 carbon atoms, and M represents an ammonium group or an alkali metal atom.

3 Claims, No Drawings

SELF-EMULSIFIABLE ANTIFOAMS

This is a continuation of application Ser. No. 114,874, filed Jan. 24, 1980, now abandoned.

The present invention relates to antifoams and more particularly to self-emulsifiable antifoams which are very effective in retarding or controlling foam formation in aqueous systems.

BACKGROUND OF THE INVENTION

Aqueous dispersions containing organopolysiloxanes in which at least 80 mol percent of the siloxane units are dihydrocarbon siloxane units, a filler and a dispersant, which may be used as antifoams are described in U.S. Pat. No. 3,650,979 to Steinbach et al. These aqueous dispersions are prepared by emulsifying in water an α, W-bis-(trimethysiloxy)-polydimethylsiloxane, finely divided silica, an emulsifier consisting of a polyglycol ether or a fatty acid ester thereof or an alkyl -or aryl-sulfate or -sulfonate and thereafter admixing the emulsion thus obtained with a fatty acid ester of hydroxyethanesulfonic acid or an alkali metal salt thereof.

In contrast to the antifoams prepared in the form of aqueous dispersions, self-emulsifying antifoams have the advantage that they can be stored in concentrated form. Moreover, compared to the self-emulsified antifoams known heretofore, which contain an organopolysiloxane in which at least 80 mol percent of the siloxane units are dihydrocarbon siloxane units, a filler and a dispersant, the self-emulsifying antifoams of this invention are more stable under storage conditions, i.e., they do not separate, especially when stored at elevated temperatures. Furthermore, aqueous dispersions prepared from the self-emulsifying antifoams of this invention are more stable.

Therefore, it is an object of this invention to provide self-emulsifying antifoams having improved storage stability. Another object of this invention is to provide self-emulsifying antifoams which are stable at elevated temperatures. A further object of this invention is to provide self-emulsifying antifoams which will form aqueous dispersions having improved stability.

SUMMARY OF THE INVENTION

The foregoing objects and others which will become apparent from the following description are accomplished in accordance with this invention, generally speaking, by providing self-emulsifying antifoams containing an organopolysiloxane in which at least 80 mole percent of the siloxane units are dihydrocarbon siloxane units, a filler, a water-soluble cellulose derivative, and as an additional dispersant, at least one compound having the following general formula:

where R is an aliphatic hydrocarbon radical having at least 7 carbon atoms, in which at least 10 percent of the number of the R radicals must have at least 11 carbon atoms and M is selected from the group consisting of an ammonium group and an alkali metal ion.

DETAILED DESCRIPTION OF THE INVENTION

The organopolysiloxanes containing at least 80 mole percent of dihydrocarbon siloxane units, which are used in the preparation of the antifoams of this invention may be the same organopolysiloxanes which contain at least 80 mole percent and more preferably 99 mole percent of dihydrocarbon siloxane units which have been used or could have been used heretofore in the preparation of organopolysiloxane-based antifoams. It is preferred that the organopolysiloxanes have units of the general formula:

where R' represents the same or different hydrocarbon radicals having from 1 to 18 carbon atoms, n is 0, 1, 2, or 3, but on the average is from 1.8 to 2.2, in which at least 80 mole percent of the siloxane units must be $R'_2SiO$ units. Because they are readily available, it is preferred that at least 90 percent of the number of R' radicals be methyl radicals. Additional examples of hydrocarbon radicals represented by R' are the ethyl radical, the 2-phenylpropyl radical and octadecyl radicals. It is preferred that the hydrocarbon radicals R' be free of aliphatic multiple bonds; however, that does not preclude the presence of vinyl radicals, e.g., vinyl dimethylsiloxy groups in the terminal units of linear organopolysiloxanes. Of course, some of the siloxane oxygen atoms in the above formula may be substituted with groups having the general formula OR'', where R'' represents an alkyl radical having from 1 to 5 carbon atoms, including the tert-butyl radical, or an aryl radical, especially the phenyl radical, or hydrogen. It is preferred that the organpolysiloxane containing at least 80 mole percent of dihydrocarbon siloxane units have a viscosity of from 35 to 500,000 $mm^2s^{-1}$ at 25° C., and more preferably have a viscosity of from 50 to 20,000 $mm^2s^{-1}$ at 25° C.

Also, mixtures of various organopolysiloxanes having at least 80 mole percent of dihydrocarbon siloxane units may be used.

The fillers used in the antifoams of this invention may be any fillers which have been used or could have been used heretofore in the preparation of antifoams containing an organo-polysiloxane and a filler. Examples of such fillers are silicon, magnesium or zinc oxides which have a particle size that does not exceed 25 micron; for example pyrogenically prepared or precipitated silicon dioxide, salts or elements of the second or the third group of the Periodic Table according to Mendeleef, having a periodic number of from 12 to 30, with aliphatic monobasic carboxylic acids or hydrocarboxylic acids, having from 12 to 22 carbon atoms, such as calcium stearate and calcium-12-hydroxystearate. Other fillers which may be used are products which remain solid at least at the temperature at which the antifoam is to be used and which are obtained from the reaction of at least one monovalent or polyvalent isocyanate with at least one organic compound containing at least one hydrogen atom which can react with the isocyanate group, such as the reaction product of naphthylene diisocyanate and cyclohexylamine. It is preferred that fillers prepared from the isocyanate and the organic compound be prepared in the presence of the organopolysiloxane containing at least 80 mole percent of dihydrocarbon siloxane units. Additional examples of fillers which may be used in this invention are lithium stearate, magnesium silicate and magnesium aluminum silicate.

Mixtures of various fillers may also be employed in the antifoams of this invention.

The filler is preferably used in amounts of from 0.1 to 30 percent by weight and more preferably from 0.2 to 20 percent by weight, based on the weight of the organopolysiloxane.

The preferred water-soluble cellulose derivatives employed in this invention are those which in a 2 percent by weight solution have a viscosity of from 10 to 10,000 mPa.s and more preferably from 20 to 7,000 mPa.s at 25° C. Examples of such water-soluble cellulose derivatives are sodium or potassium salts of cellulose esters, such as cellulose sulfate and cellulose ethers, such as sodium carboxymethylcellulose, sodium carboxyethylcellulose, sodium-cellulose ethane sulfonic acid, methylcellulose, hydroxyethyl methylcellulose, hydroxypropyl methylcellulose, hydroxyethylcellulose, hydroxylpropylcellulose, hydroxyethyl sodium carboxymethylcellulose, ethylcellulose and sodium carboxymethylmethylcellulose. The preferred water-soluble cellulose derivatives are methylcellulose and cellulose derivatives containing sodium and carboxymethyl groups, such as sodium carboxymethylcellulose.

Mixtures of various water-soluble cellulose derivatives may be employed in the antifoams of this invention.

Preferably the water-soluble cellulose derivatives are used in amounts of from 2 to 30 percent by weight and more preferably from 10 to 25 percent by weight, based on the total weight of the organopolysiloxane, the water-soluble cellulose derivative, the filler and compounds having the general formula:

$RCOO(CH_2)_2SO_3M$.

Dispersants which are used in this invention in addition to the water-soluble cellulose derivatives are salts of esters of aliphatic carboxylic acids containing at least 7 carbon atoms, with isethionic acid. The radical represented by R may be a straight or branched chain with the preferred radical being a straight chain. Furthermore, the R radical may be saturated or contain at least one aliphatic multiple bond. It is preferred that the R radical contain from 12 to 19 carbon atoms. Examples of RCOO radicals are the lauroyl, myristoyl, palmityl, stearoyl, palmitoleyl and the oleyl radical, as well as the coco fatty acid radical. The preferred RCOO radicals are the stearoyl and the oleyl radicals.

The alkali metal atoms represented by M are lithium, sodium, potassium, rubidium or cesium. Because of its availability, preferably the M radical is sodium.

Likewise, it is possible to use mixtures of various compounds having the general formula $RCOO(CH_2)_2SO_3M$.

It is preferred that the antifoams of this invention contain the compound having the general formula $RCOO(CH_2)_2SO_3M$ in an amount of from 5 to 25 percent by weight and more preferably from 10 to 18 percent by weight, based on the total weight of the organopolysiloxane, the filler, the water-soluble cellulose derivative and the compound having the formula $RCOO(CH_2)_2SO_3M$.

The antifoams of this invention can be prepared by mixing an organopolysiloxane containing at least 80 mole percent of dihydrocarbon siloxane units, a filler, a water-soluble cellulose derivative and a compound having the general formula $RCOO(CH_2)_2SO_3M$ in any desired sequence. The ingredients can be hand-mixed or they can be mixed in any suitable mechanical mixer, such as a leaf or disk stirrer, or a planetary mixer. The antifoam composition can be prepared at room temperature and at atmospheric pressure. However, if desired, higher or lower temperatures as well as higher or lower pressures may be used. However, temperatures in excess of about 60° C. should be avoided.

The term "self-emulsifiable" implies that the antifoams of this invention are essentially anhydrous, at least prior to their use as an additive to retard or at least control the formation of foam. This does not, however, preclude the possibility of water being present during the preparation of the antifoams.

The antifoams of this invention may be used by the end-user without dilution or they may be diluted by the end-user with water in any desired concentration and at any temperature between the melting point and the boiling point of the water, especially between 10° and 30° C. When diluted with water, the antifoams of this invention remain stable under storage conditions even when diluted to a concentration of for example 5 percent by weight. Furthermore, the aqueous diluted antifoams of this invention are stable to boiling and electrolytes, with the result that they may be employed for a great variety of purposes.

The antifoams of this invention may be used to retard or to control the formation of foam, especially in aqueous solutions, for example as additives to detergents, or as an additive to one or several of the ingredients of detergents, such as sodium tripolyphosphate and/or sodium perborate. Furthermore, they may be used during the concentration of alkali spent liquors in paper mills, during the concentration of rubber latex, with cutting oil emulsions in metal processing plants, in dispersion dyes and in synthetic resin dispersions, in lubricants, in petroleum production, textile dyes, including jet dyeing, effluent clarification, fermentation processes, for ore flotation purposes and in manufacturing antibiotics.

In the following examples all percentages are by weight unless otherwise specified.

EXAMPLE 1

About 2.5 kg of a mixture consisting of 95 percent of a dimethylpolysiloxane which is end-blocked with trimethylsiloxy groups and which has a viscosity of 350 $mm^2s^{-1}$ at 25° C., and 5 percent of pyrogenically obtained silicon dioxide having a BET surface area of about 150 $m^2/g$, are mixed within 15 minutes with 600 g of a sodium salt of stearoyl isethionic acid with the aid of a planetary mixer. The same mixing device is used to incorporate within 12 minutes into the resultant mixture, 1 kg of sodium carboxymethylcellulose, whose 2 percent aqueous solution has a viscosity of 200 mPa.s at 25° C. When the self-emulsifiable antifoam thus obtained is placed in a paddle-equipped agitator and 96 liters of distilled water are added, an emulsion is obtained which is very stable and is very effective in controlling the formation of foam.

EXAMPLE 2

About 3.2 kg of a mixture consisting of 90 percent of a dimethylpolysiloxane which is end-blocked with trimethylsiloxy groups and which has a viscosity of 1,000 $mm^2s^{-1}$, and 5 percent of pyrogenically obtained silicon dioxide having a BET surface area of about 150 $m^2/g$ and 5 percent of calcium stearate, are mixed within 12 minutes with 500 g of a sodium salt of stearoyl isethionic acid with the aid of a planetary mixer. Within the next 12 minutes, 300 g of methylcellulose, which in a 2 percent aqueous solution has a viscosity of 1,100 mPa.s at 25° C. is incorporated with the same mixing device. When 120 liters of distilled water are mixed with the self-emulsifying antifoam in a paddle-equipped agitator, the resultant emulsion is very stable and is highly effective in retarding or controlling the formation of foam.

What is claimed is:

1. A self-emulsifiable antifoam composition which is essentially anhydrous consisting essentially of an organopolysiloxane in which at least 80 mole percent of the siloxane units are dihydrocarbon siloxane units, a filler in an amount of from about 0.1 to about 30 percent by weight based on the weight of the organopolysiloxane, a water-soluble cellulose derivative in an amount of from about 2 to 30 percent by weight based on the weight of the composition and from about 5 to about 25 percent by weight based on the weight of the composition of at least one compound of the general formula $RCOO(CH_2)_2SO_3M,$ where R is an aliphatic hydrocarbon radical having at least 7 carbon atoms, in which at least 10 percent of the number of R radicals must have at least 11 carbon atoms, and M is selected from the group consisting of an ammonium group and an alkali metal ion.

2. The self-emulsifiable antifoam composition of claim 1, wherein R is a straight-chain hydrocarbon radical having from 12 to 19 carbon atoms, and M is sodium.

3. The self-emulsifiable antifoam composition of claim 1, wherein the compound having the general formula:

$RCOO(CH_2)_2SO_3M$ is present in an amount of from about 10 to about 18 percent by weight, based on the total weight of the composition, wherein R is an aliphatic hydrocarbon radical having at least 7 carbon atoms in which at least 10 percent of the number of the R radicals must have at least 11 carbon atoms and M is selected from the group consisting of an ammonium group and an alkali metal ion.

* * * * *